United States Patent
Krishnan et al.

(10) Patent No.: US 12,321,477 B2
(45) Date of Patent: Jun. 3, 2025

(54) MANAGEMENT OF ACCESS TO DATA IN A DISTRIBUTED DATABASE

(71) Applicant: Accenture Global Solutions Limited, Dublin (IE)

(72) Inventors: Sunil Krishnan, Mumbai (IN); Deepak Lalan, Bangalore (IN); Melvin James Tomy, Delhi (IN); Amit Punamchand Kawad, Maharashtra (IN); Sunil Gunasekaran, Bengaluru (IN); Michael William Klein, Golden Valley, MN (US)

(73) Assignee: Accenture Global Solutions, Dublin (IE)

( * ) Notice: Subject to any disclaimer, the term of this patent is extended or adjusted under 35 U.S.C. 154(b) by 733 days.

(21) Appl. No.: 17/085,522

(22) Filed: Oct. 30, 2020

(65) Prior Publication Data
US 2022/0138344 A1 May 5, 2022

(51) Int. Cl.
*G06F 21/62* (2013.01)
*G06F 16/21* (2019.01)
(Continued)

(52) U.S. Cl.
CPC ........ *G06F 21/6227* (2013.01); *G06F 16/217* (2019.01); *G06F 16/2471* (2019.01); *G06F 16/248* (2019.01); *G06F 21/31* (2013.01)

(58) Field of Classification Search
CPC ............. G06F 21/6227; G06F 16/2471; G06F 16/217; G06F 16/248; G06F 21/31
(Continued)

(56) References Cited

U.S. PATENT DOCUMENTS

| | | | |
|---|---|---|---|
| 2001/0027467 A1* | 10/2001 | Anderson | G06F 16/27 709/224 |
| 2010/0174608 A1* | 7/2010 | Harkness | H04L 63/12 726/26 |

(Continued)

OTHER PUBLICATIONS

Zaharia, "Spark: Cluster Computing with Working Sets", 2010, USENIX, pp. 1-6 (Year: 2010).*

(Continued)

*Primary Examiner* — Taghi T Arani
*Assistant Examiner* — Gregory A Lane
(74) *Attorney, Agent, or Firm* — Polsinelli PC (57) ABSTRACT

In some implementations, a distributed database management system may monitor data operations performed by a plurality of user devices, wherein the data operations are associated with a distributed database. The distributed database management system may detect that a user device is to perform a data operation associated with a data structure of the distributed database. The distributed database management system may determine identification information associated with the user device. The distributed database management system may generate, based on the data operation, evidence information associated with the data operation, wherein the evidence information includes the identification information. The distributed database management system may store the evidence information in an immutable data structure to record that the user device is associated with the data operation. The distributed database management system may enable the user device to perform the data operation after the evidence information is stored in the immutable data structure.

17 Claims, 5 Drawing Sheets

(51) Int. Cl.
*G06F 16/2458* (2019.01)
*G06F 16/248* (2019.01)
*G06F 21/31* (2013.01)

(58) Field of Classification Search
USPC .......................................... 726/26
See application file for complete search history.

(56) References Cited

U.S. PATENT DOCUMENTS

2015/0332028 A1* 11/2015 Dahon .................... G06F 21/60
                                                            726/17
2019/0347339 A1   11/2019 Becker et al.
2020/0410086 A1* 12/2020 Harmon ................ G06F 16/252
2021/0241869 A1*  8/2021 Muse ...................... G06F 9/542
2022/0070006 A1*  3/2022 Jetzfellner ............ H04L 9/3242

OTHER PUBLICATIONS

Extended European Search Report for Application No. EP21183375.1, mailed on Dec. 15, 2021, 9 pages.

* cited by examiner

MANAGEMENT OF ACCESS TO DATA IN A DISTRIBUTED DATABASE

BACKGROUND

A distributed database includes two or more data structures that are separately located in different sites, datacenters, and/or storage devices. The data structures may be within a same network or within different networks. The distributed database is controlled by a centralized server and/or system that enables access to data within the data structures of the distributed database.

SUMMARY

In some implementations, a method includes monitoring data operations performed by a plurality of user devices, wherein the data operations are associated with a distributed database; detecting that a user device, of the plurality of user devices, is to perform a data operation associated with a data structure of the distributed database; determining identification information associated with the user device; generating, based on the data operation, evidence information associated with the data operation, wherein the evidence information includes the identification information; storing the evidence information in an immutable data structure to record that the user device is associated with the data operation; and enabling the user device to perform the data operation after the evidence information is stored in the immutable data structure.

In some implementations, a device includes one or more memories and one or more processors, communicatively coupled to the one or more memories, configured to: detect a data operation associated with an application of a user device, wherein the data operation is to involve a data structure of a distributed database; determine identification information associated with a user of the application; generate, based on the data operation, evidence information associated with the data operation, wherein the evidence information includes the identification information; store the evidence information in an immutable data structure to record that the user is associated with the data operation; and enable performance of the data operation within the data structure.

In some implementations, a non-transitory computer-readable medium storing a set of instructions includes one or more instructions that, when executed by one or more processors of a device, cause the device to: intercept a communication from a user device to a distributed database, wherein the communication is associated with a data operation that involves a plurality of data structures of the distributed database; determine, based on the communication, evidence information associated with the data operation, wherein the evidence information identifies one or more parameters of the data operation; and store the evidence information in an immutable data structure to record that the user device is associated with the data operation.

DETAILED DESCRIPTION

The following detailed description of example implementations refers to the accompanying drawings. The same reference numbers in different drawings may identify the same or similar elements.

A distributed database can allow multiple individuals associated with multiple organizations to access and/or update data (e.g., application data, electronic files, electronic documents, code, electronic media, among other examples) stored in the distributed database. In some distributed database systems, individuals may independently update the data without approval from other individuals. Accordingly, certain individuals may fraudulently and/or deceivingly manipulate and/or tamper with the data. While certain blockchain systems allow for immutable updates to a dataset and/or tracking of the immutable updates, such blockchain systems require a complex, decentralized, and distributed ledger that requires authentication and/or authorization of parties attempting to update and/or access the data and/or a relatively large amount of immutable storage.

Some implementations described herein provide a distributed database management system that monitors data operations associated with data structures in the distributed database and maintains a persistent evidence ledger that includes evidence information associated with the data operations. The persistent evidence ledger and/or evidence information provides a centralized management system and/or a distributed management system that immutably tracks access and/or updates to data in data structures of the distributed database. For example, for a particular data operation, the distributed database management system may store an entry in the persistent evidence ledger that identifies one or more parameters of the data operation (e.g., a parameter associated with a user associated with the data operation, a parameter associated with a user device associated with the data operation, a parameter associated with a data structure involved in the data operation, among other example parameters). As a result, the distributed database management system may maintain a record of information associated with data operations that involve access and/or updates to a distributed database to permit users (e.g., from multiple organizations and/or groups) to identify and/or determine sources of changes and/or updates to data in the distributed database. Moreover, relative to previous techniques, the distributed database management system, as described herein, may conserve computing resources (e.g., processing resources, memory resources, and/or storage resources, among other examples) associated with monitoring and/or tracking updates to the data that might otherwise be used in other decentralized systems (e.g., blockchain systems) by reducing a quantity of communications between devices that are able to perform updates and/or access data associated with the other decentralized systems.

In some implementations, a distributed database management system may process hundreds, thousands, millions, or more entries communications associated with hundreds, thousands, millions, or more data operations that may include or involve different types of operations, different types of data, different users or organizations, and/or the like. Additionally, or alternatively, the distributed database management system may store (e.g., in a persistent evidence ledger) hundreds, thousands, millions, or entries of evidence information associated with the hundreds, thousands, millions, or more data operations.

Figure 1A:
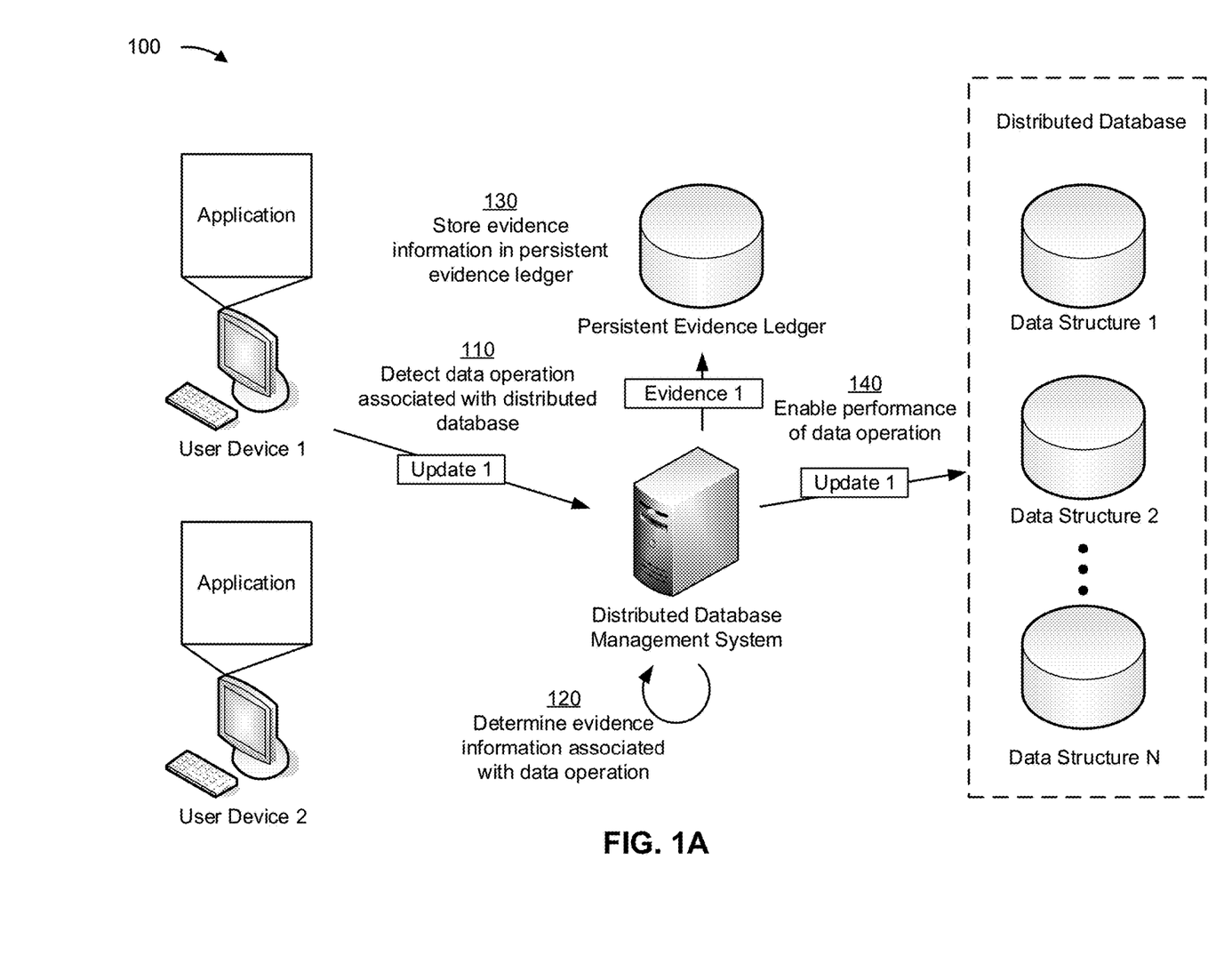
FIGS. 1A-1B are diagrams of an example implementation described herein.
Figure 1B:
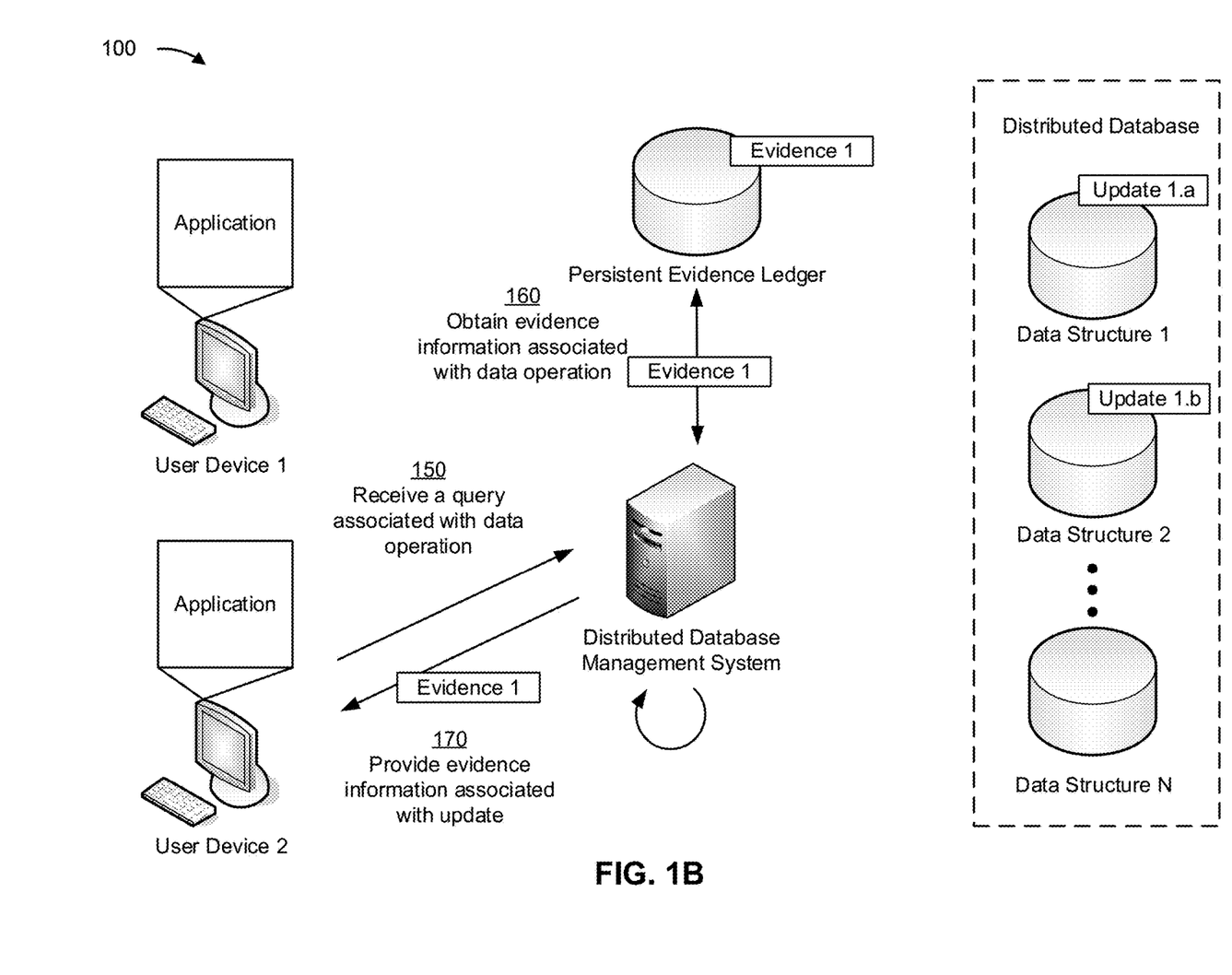

FIGS. 1A-1B are diagrams of an example 100 associated with managing access to data in a distributed database. As shown in FIGS. 1A-1B, example 100 includes a first user device ("User Device 1") and a second user device ("User Device 2") (referred to herein collectively as "the user devices"), a distributed database management system, a persistent evidence ledger, and a distributed database that includes N data structures (where N is an integer greater than 2) (shown as "Data Structure 1" to "Data Structure N" and referred to collectively as the "data structures").

According to some implementations, the distributed database management system may be associated with and/or accessible to multiple organizations. For example, the first user device may be associated with a first organization and the second user device may be associated with a second organization that is separate from the first organization. In such a case, the first organization may be separate from the second organization based on being owned and/or operated by separate individuals and/or entities (e.g., enterprises, groups of individuals, and/or the like). Accordingly, as described herein, the first user device, the second user device, and the distributed database may allow multiple different organizations to access a same set of data that is stored and/or maintained by the distributed database and the distributed database management system may ensure that any changes to the data in the distributed database are identified, tracked, and/or recorded to prevent a first organization from updating the data without a second organization detecting or identifying that the first organization updated that data.

According to some implementations, the user devices may include an application (e.g., an instance of an application is installed on the first user device and the second user device) that is associated with the distributed database. The distributed database may store application data associated with the application. Accordingly, as described herein, the user devices, when performing a data operation, may perform one or more actions associated with reading data from a data structure of the distributed database and/or writing data to a data structure of the distributed database. In this way, one or more users of the user devices may create, read, update, and/or delete data from a particular data structure of the distributed database. The data structures of the distributed database may include separate copies of a same set of application data (e.g., for redundancy) and/or mutually exclusive portions of a set of data of the distributed database.

As shown in FIG. 1A, and by reference number 110, the distributed database management system detects a data operation associated with the distributed database. For example, as a centralized server of the distributed database (e.g., a centralized server of a spiderweb deployment of the distributed database), the distributed database management system may be configured to receive and/or intercept communications between the distributed database and the user devices. Accordingly, the distributed database management system may manage data operations, prevent data operations, and/or authorize data operations, among other examples.

The distributed database management system may monitor the data operations performed by the user devices by inspecting the communications between the user devices and the distributed database. Accordingly, as shown in FIG. 1A, the distributed database management system may determine that the first user device is performing a data operation associated with providing update data (shown as "Update 1") that is to be included in the distributed database. The update data may be associated with a data operation that involves creating new data in the distributed database, modifying data in the distributed database, and/or deleting data from the distributed database.

In some implementations, based on receiving a communication of a data operation and/or identifying a data operation (e.g., a data operation that includes an update to the distributed database or an operation other than a read operation), the distributed database management system may activate a suspension of the data operation while the distributed database management system determines and/or persists evidence information, as described herein. In such a case, the distributed database management system may prevent the data operation from being performed within the distributed database (e.g., to data in the distributed database) until evidence information associated with the data operation is persisted in the persistent evidence ledger.

In this way, the distributed database management system may detect a data operation associated with the distributed database to determine evidence information associated with the data operation and/or enable the data operation.

As further shown in FIG. 1A, and by reference number 120, the distributed database management system determines evidence information associated with the data operation. For example, the communication may include and/or identify one or more parameters associated with the data operation. In such a case, the distributed database management system may analyze the communication to determine the one or more parameters. The one or more parameters may include identification information associated with the user device, such as an identifier of the first user device, an identifier of a user of the application (e.g., a user that initiated the data operation). Additionally, or alternatively, the one or more parameters may include one or more parameters associated with the data operation, such as a timing associated with the data operation (e.g., a timestamp when the operation is to be performed, when the operation was initiated, and/or the like), a type of the data operation (e.g., a create operation, a read operation, an update operation, a delete operation, and/or the like), update data associated with the data operation (e.g., data that is to be updated and/or a change to the data in the distributed database, according to the data operation), among other example information. In some implementations, the one or more parameters may include one or more parameters associated with the distributed database, such as identifiers of data structures associated with the data operation (e.g., addresses of the distributed database that are associated with data that is to be read or updated), among other examples.

In some implementations, the distributed database management system may perform an authentication process to obtain and/or determine the identification information associated with the user device. For example, the authentication process may involve obtaining user credentials (e.g., log-in credentials, such as a username, digital signature, and/or a biometric, among other examples) associated with the user of the application that has requested performance of the data operation (e.g., via one or more user inputs to the application). Additionally, or alternatively, the authentication process may be configured to verify, based on a device identifier (e.g., a serial number, an address (e.g., a media-access control (MAC) address, an Internet protocol (IP) address, and/or the like), that the user device is permitted and/or authorized to perform the operation. In this way, the distributed database management system may determine that the first user device and/or the user is authorized to perform the data operation based on the identification information and/or to use the identification information as evidence information to maintain a record of which user and/or which user device performed the data operation.

In this way, the distributed database management system may determine that the evidence information is to include one or more of the parameters (e.g., based on one or more settings or configurations of the distributed database management system and/or the distributed database), and correspondingly may generate the evidence information for storage in the persistent evidence ledger.

As further shown in FIG. 1A, and by reference number 130, the distributed database management system stores evidence information in the persistent evidence ledger. The persistent evidence ledger may be any suitable persistent data structure that is immutable. Therefore, any entries, once added to the persistent evidence ledger, cannot be altered or removed from the persistent evidence ledger. In this way, the evidence information (shown as "Evidence 1") may be persisted in the persistent evidence ledger to prevent any malicious individual or user from altering any evidence information associated with data operations involving the distributed database.

As described herein, the evidence information may be determined and/or generated based on one or more of the parameters associated with the data operation. Accordingly, evidence information for a data operation may include one or more of an identifier of the first user device, an identifier of the user of the application running on the first user device, timing associated with the data operation, an identifier of the data structure, a type of the data operation, and/or update data associated with the data operation, among other examples. The evidence information may be saved and/or stored in one or more entries of the persistent evidence ledger. In some implementations, the persistent evidence ledger may be searchable (e.g., by the distributed database management system) via one or more fields of the entries (e.g., fields corresponding to the one or more parameters of the data operation). In this way, one or more look-up operations can be performed to identify evidence information associated with the data operation.

In this way, the distributed database management system stores the evidence information in the persistent evidence ledger to record that the user and/or the user device is associated with the data operation.

As further shown in FIG. 1A, and by reference number 140, the distributed database management system enables the performance of the data operation. For example, the data operation may be performed to enable the data in the data structure to be modified with the update data (and/or read) according to the data operation.

In some implementations, the distributed database management system may enable and/or authorize the performance of the data operation based on determining that the evidence information has been stored in the persistent evidence ledger. For example, based on determining that the evidence information was properly obtained (e.g., according to an authentication process and/or analysis of the communication) and stored, the distributed database management system may deactivate the suspension of the data operation to permit the performance of the data operation within the distributed database and/or on data within the distributed database. Accordingly, the distributed database management system may ensure that the evidence information has been recorded prior to allowing the data operation to be performed, to prevent potential inaccuracies associated with tracking and/or monitoring data operations (e.g., errors that can result from the performance of the data operation without persisting the evidence information, such as a system failure or attack during or prior to the evidence information being stored in the persistent evidence ledger).

In this way, the distributed database management system may authorize performance of the data operation based on the user device and/or user being authorized to perform the data operation, and/or enable another user device (e.g., the second user device) or another user to interact with updated data of the data operation via the distributed database.

As shown in FIG. 1B, and by reference number 150, the distributed database management system receives a query associated with the data operation. For example, after the data operation is performed (e.g., after data in the distributed database is updated according to the data operation), the second user device (or a user associated with the second user device) may request, via the query, the evidence information from the persistent evidence ledger that is associated with the data operation. The query may include a communication (e.g., a request or message) that includes and/or identifies one or more of the parameters of the data operation. As a more specific example, the query may include an identifier and/or address of the data and/or data structure in the distributed database that was updated by the data operation.

In this way, the distributed database management system may receive the query to permit the distributed database management system to identify and/or provide evidence information associated with the data operation.

As further shown in FIG. 1B, and by reference number 160, the distributed database management system obtains the evidence information associated with the data operation from the persistent evidence ledger. The distributed database management system may identify an entry that includes the evidence associated with the data operation based on the query including one or more of the parameters associated with the data operation, such as an address associated with the data operation (e.g., a storage address of the distributed database), an identifier of a file associated with the data operation, an identifier of a data structure associated with the data operation, and/or the like. Accordingly, based on the query, the distributed database management system may perform a look-up operation to identify the evidence information in the persistent evidence ledger.

In this way, the distributed database management system may identify and/or obtain the evidence information to permit the second user device to receive information that indicates that the first user device is associated with the data operation.

As further shown in FIG. 1B, and by reference number 170, the distributed database management system provides the evidence information to the second user device. For example, the distributed database management system may provide evidence information that identifies that the first user device is associated with the data operation, that a particular user of the first user device is associated with the data operation, timing associated with the data, and/or the like. In some implementations, the distributed database management system (e.g., based on the query) may obtain update data associated with the data operation. For example, as shown, the data operation included updating Data Structure 1 to include first update data ("Update 1.*a*") and updating Data Structure 2 to include second update data ("Update 1.*b*"). Accordingly, the evidence information may include the first update data and the second update data. Additionally, or alternatively, the evidence may include a difference between the first update data and previous data that was modified to include the first update data and/or a difference between the second update data and previous data that was modified to include the second update data.

According to some implementations, the distributed database management system may perform an authentication process (similar to the authentication process described above in connection with the first user device) to determine and/or verify that the second user device (and/or a user of the second user device) is authorized to access the distributed database and/or access the evidence information from the persistent evidence ledger.

In this way, the distributed database management system provides a centralized system that enables immutable records associated with data operations to be maintained to permit a plurality of users, organizations, and/or devices to identify and/or track changes to data in a distributed database.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
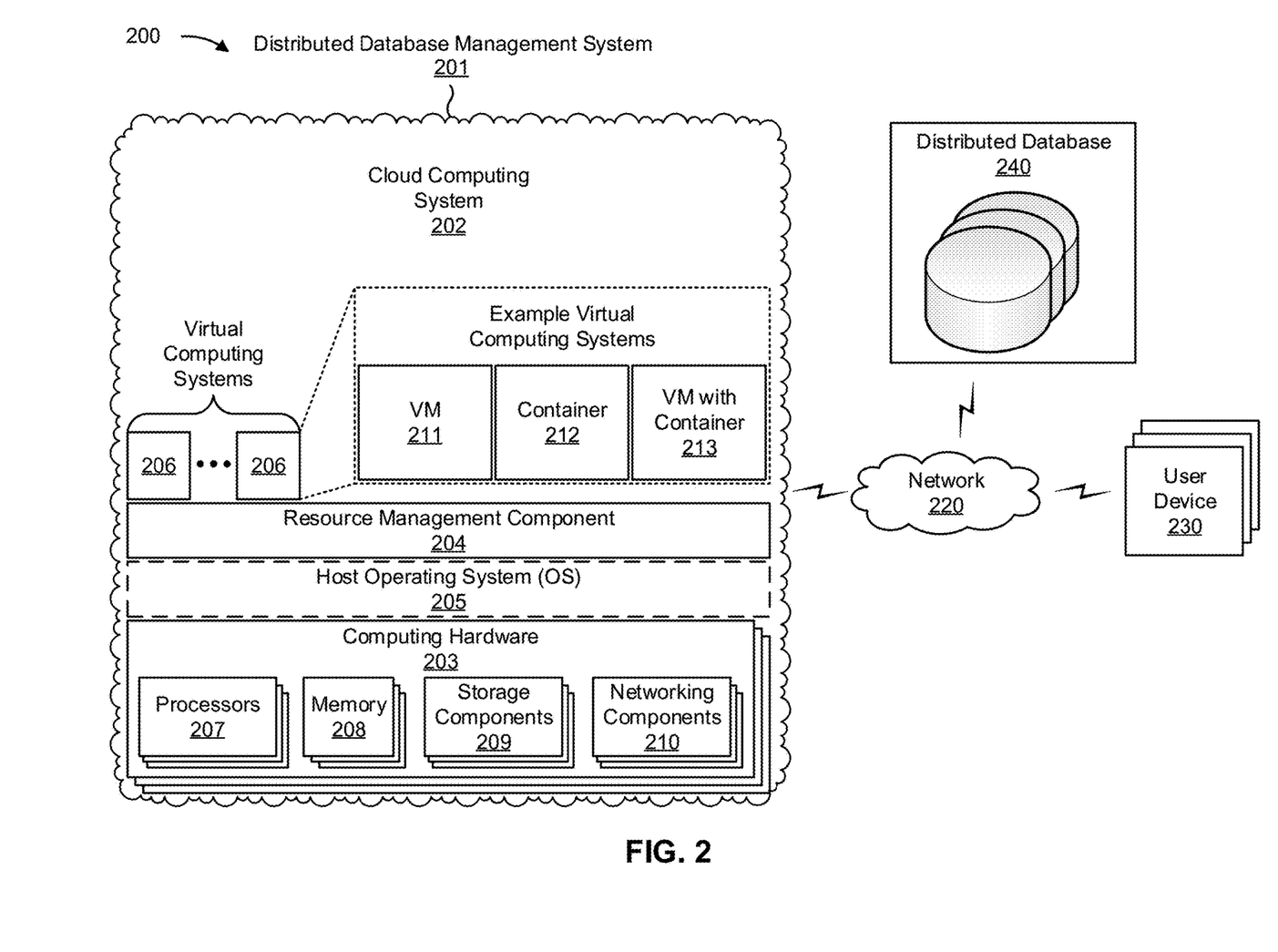
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a distributed database management system 201, which may include one or more elements of and/or may execute within a cloud computing system 202. The cloud computing system 202 may include one or more elements 203-213, as described in more detail below. As further shown in FIG. 2, environment 200 may include a network 220, one or more user devices 230 (referred to herein individually as "user device 230," and collectively as "user devices 230"), and/or a distributed database 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The distributed database management system 201 may correspond to the distributed data management system of example 100. For example, the distributed database management system 201 may be configured to manage access and/or updates to data in data structures of the distributed database 240. In particular, the distributed database management system 201 may store and/or maintain evidence information in a persistent evidence ledger (e.g., using storage components 209) associated with access and/or updates to the data in the data structures of the distributed database 240, as described herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the distributed database management system 201 may include one or more elements 203-213 of the cloud computing system 202, may execute within the cloud computing system 202, and/or may be hosted within the cloud computing system 202, in some implementations, the distributed database management system 201 may not be cloud-based (e.g., may be implemented outside of a cloud computing system) or may be partially cloud-based. For example, the distributed database management system 201 may include one or more devices that are not part of the cloud computing system 202, such as device 300 of FIG. 3, which may include a standalone server or another type of computing device. The distributed database management system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The user device 230 includes one or more devices capable of receiving, generating, storing, processing, and/or providing information associated with a data operation that involve a distributed database (e.g., the distributed database 240), as described elsewhere herein. The user device 230 may include a communication device and/or a computing device. For example, the user device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 230 may communicate with one or more other devices of environment 200, as described elsewhere herein.

The distributed database 240 may include one or more data structures (or other storage devices) that are configured to store one or more sets of data in a distributed manner as described herein. The distributed database 240 may be associated with a particular application and/or configured to store and/or maintain application data associated with the data. Such an application may be configured and/or installed one or more of the user devices 230 to enable the one or more user devices 230 to independently access a same set of the application data.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
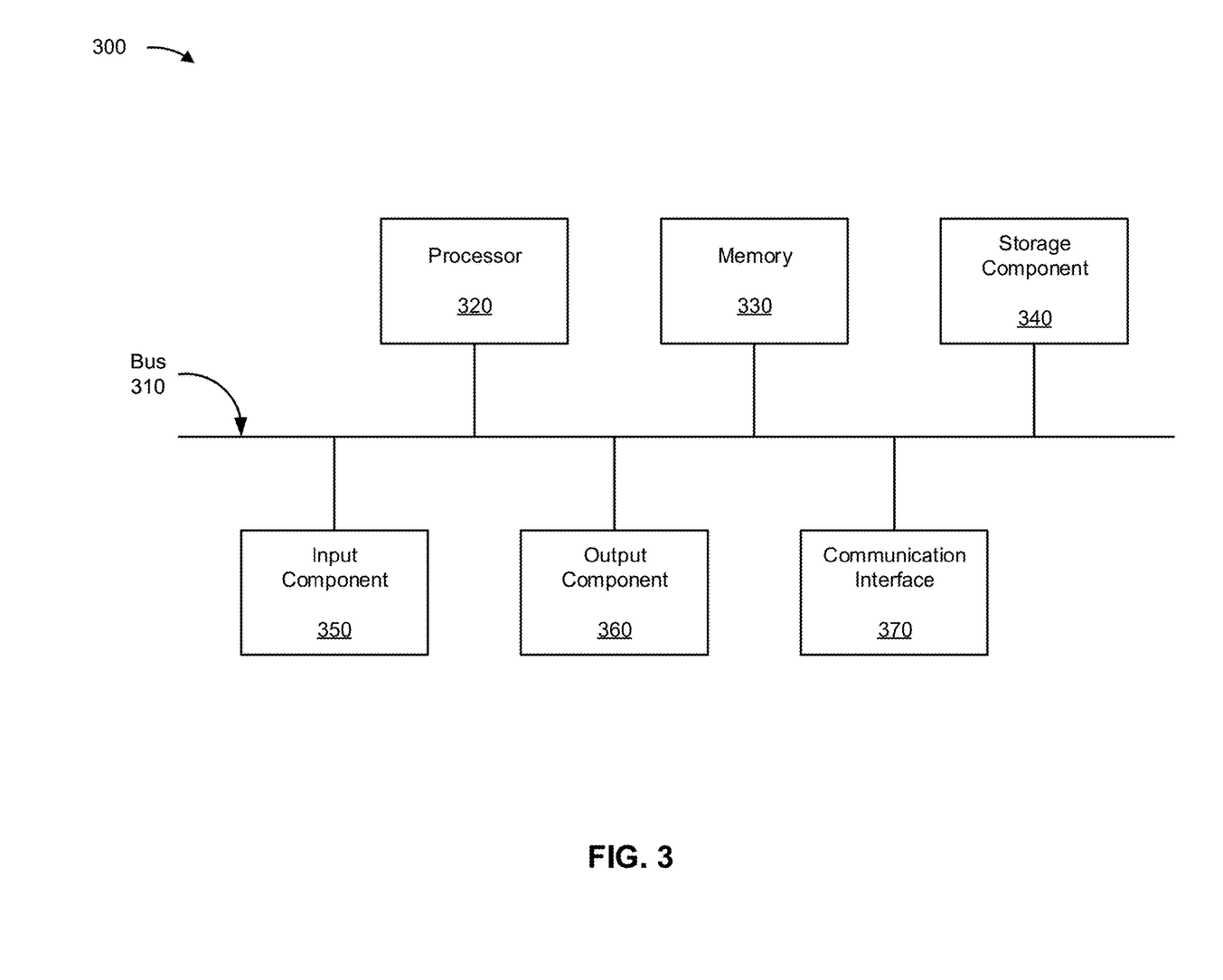
FIG. 3 is a diagram of example components of one or more devices of FIG. 2.

FIG. 3 is a diagram of example components of a device 300, which may correspond to distributed database management system 201, user device 230, and/or distributed database 240. In some implementations, distributed database management system 201, user device 230, and/or distributed database 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
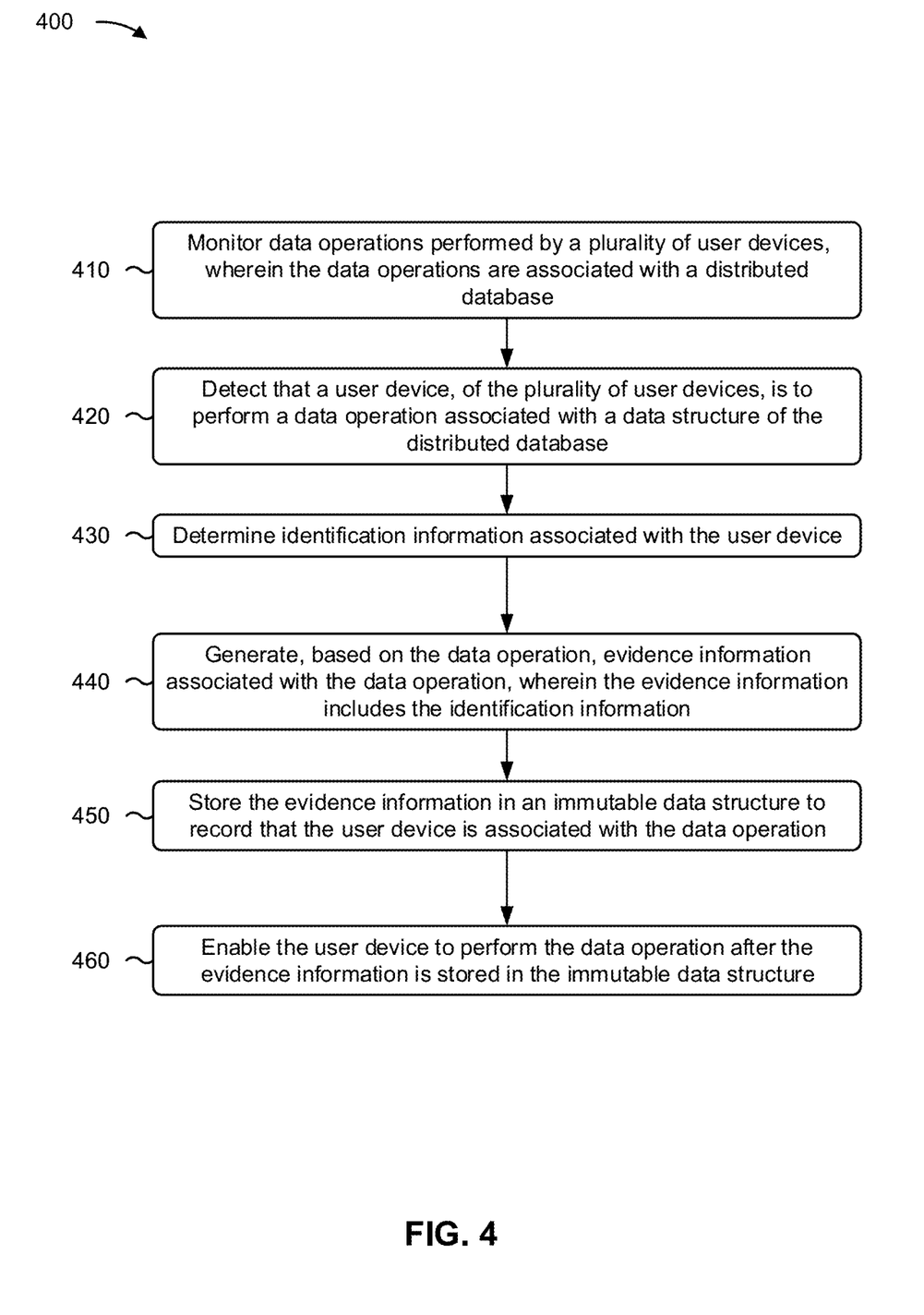
FIG. 4 is a flowchart of an example process associated with managing access to data in a distributed database.

FIG. 4 is a flowchart of an example process 400 associated with managing access to data in a distributed database. In some implementations, one or more process blocks of FIG. 4 may be performed by a distributed data management system (e.g., distributed data management system 201). In some implementations, one or more process blocks of FIG. 4 may be performed by another device or a group of devices separate from or including the distributed data management system, such as a user device (e.g., user device 230) and/or a distributed database (e.g., distributed database 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include monitoring data operations performed by a plurality of user devices, wherein the data operations are associated with a distributed database (block 410). For example, the distributed data management system may monitor data operations performed by a plurality of user devices, as described above. In some implementations, the data operations are associated with a distributed database.

As further shown in FIG. 4, process 400 may include detecting that a user device, of the plurality of user devices, is to perform a data operation associated with a data structure of the distributed database (block 420). For example, the distributed data management system may detect that a user device, of the plurality of user devices, is to perform a data operation associated with a data structure of the distributed database, as described above.

As further shown in FIG. 4, process 400 may include determining identification information associated with the user device (block 430). For example, the distributed data management system may determine identification information associated with the user device, as described above.

As further shown in FIG. 4, process 400 may include generating, based on the data operation, evidence information associated with the data operation, wherein the evidence information includes the identification information (block 440). For example, the distributed data management system may generate, based on the data operation, evidence information associated with the data operation, as described above. In some implementations, the evidence information includes the identification information.

As further shown in FIG. 4, process 400 may include storing the evidence information in an immutable data structure to record that the user device is associated with the data operation (block 450). For example, the distributed data management system may store the evidence information in an immutable data structure to record that the user device is associated with the data operation, as described above.

As further shown in FIG. 4, process 400 may include enabling the user device to perform the data operation after the evidence information is stored in the immutable data structure (block 460). For example, the distributed data management system may enable the user device to perform the data operation after the evidence information is stored in the immutable data structure, as described above.

Process 400 may include additional implementations, such as any single implementation or any combination of implementations described below and/or in connection with one or more other processes described elsewhere herein.

In a first implementation, determining the identification information comprises identifying, from the user device, user credentials associated with an application that performed the data operation, wherein the distributed database is configured to store application data associated with the application, and determining that the identification information corresponds to a user identifier of a user associated with the user credentials.

In a second implementation, alone or in combination with the first implementation, the identification information corresponds to a device identifier of the user device that is included in metadata associated with the data operation.

In a third implementation, alone or in combination with one or more of the first and second implementations, process 400 includes, prior to generating the evidence information, determining one or more parameters associated with the data operation, wherein the evidence information includes data operation information associated with the one or more parameters.

In a fourth implementation, alone or in combination with one or more of the first through third implementations, the one or more parameters include at least one of timing associated with the data operation, an identifier of the data structure, a type of the data operation, or updating data associated with the data operation.

In a fifth implementation, alone or in combination with one or more of the first through fourth implementations, the user device is a first user device, and process 400 further includes receiving, from a second user device of the plurality of user devices, a query associated with the evidence information, determining that the second user device is authorized to access the distributed database, and providing, to the second user device and based on determining that the second user device is authorized to access the distributed database, the evidence information to indicate that the first user device is associated with the data operation. The first user device may be associated with a first organization and the second user device is associated with a second organization that is separate from the first organization.

In a sixth implementation, alone or in combination with one or more of the first through fifth implementations, the distributed database is configured to store application data associated with an application of the user device, and the data operation is associated with a function of the application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
monitoring, by a device, data operations performed by a plurality of user devices,
   wherein the data operations are associated with a distributed database;
detecting, by the device, that a first user device, of the plurality of user devices, is to perform a data operation associated with a data structure of the distributed database;
suspending, by the device, the data operation from being performed within the distributed database until evidence information associated with the data operation is persisted in an immutable data structure;
determining, by the device, identification information associated with the first user device;
generating, by the device and based on the data operation, the evidence information,
   wherein the evidence information includes the identification information including one or more identifiers of the data structure that is associated with the data operation,
   wherein the one or more identifiers of the data structure include address of the data structure in the distributed database, and
   wherein the association of the data structure with the data operation includes at least one of reading data from the data structure or updating the data on the data structure;
storing, by the device, the evidence information in the immutable data structure to record that the first user device is associated with the data operation;
enabling, by the device, the first user device to perform the data operation after the evidence information is stored in the immutable data structure,
   wherein enabling the first user device to perform the data operation comprises:
      deactivating a suspension of the data operation based on determining that the evidence information has been stored in the immutable data structure;
receiving, from a second user device of the plurality of user devices, a query associated with the evidence information,
   wherein the first user device is associated with a first organization and the second user device is associated with a second organization that is separate from the first organization;
determining that the second user device is authorized to access the distributed database; and
providing, to the second user device and based on determining that the second user device is authorized to access the distributed database, the evidence information to indicate that the first user device is associated with the data operation.

2. The method of claim 1, wherein determining the identification information comprises:
identifying, from the first user device, user credentials associated with an application that performed the data operation,
   wherein the distributed database is configured to store application data associated with the application; and
determining that the identification information corresponds to a user identifier of a user associated with the user credentials.

3. The method of claim 1, wherein the identification information corresponds to a device identifier of the first user device that is included in metadata associated with the data operation.

4. The method of claim 1, further comprising:
prior to generating the evidence information, determining one or more parameters associated with the data operation,
wherein the evidence information includes data operation information associated with the one or more parameters.

5. The method of claim 4, wherein the one or more parameters include at least one of:
timing associated with the data operation;
a type of the data operation; or
update data associated with the data operation.

6. The method of claim 1, wherein the distributed database is configured to store application data associated with an application of the first user device and the data operation is associated with a function of the application.

7. A device, comprising:
one or more memories; and
one or more processors, communicatively coupled to the one or more memories, configured to:
detect a data operation associated with an application of a first user device,
   wherein the data operation is to involve a data structure of a distributed database;
suspend the data operation from being performed within the distributed database until evidence information associated with the data operation is persisted in an immutable data structure;
determine identification information associated with a user of the application;
generate, based on the data operation, the evidence information,
   wherein the evidence information includes the identification information including one or more identifiers of the data structure that is associated with the data operation,
   wherein the one or more identifiers of the data structure include address of the data structure in the distributed database, and
   wherein the association of the data structure with the data operation includes at least one of reading data from the data structure or updating the data on the data structure;
store the evidence information in the immutable data structure to record that the user is associated with the data operation;
enable performance of the data operation within the data structure,
   wherein the one or more processors, to enable the performance of the data operation, are configured to:
      deactivate a particular suspension of the data operation based on determining that the evidence information has been stored in the immutable data structure;
receive, from a second user device, a query associated with the evidence information,
   wherein the first user device is associated with a first organization and the second user device is associated with a second organization that is separate from the first organization;
determine that the second user device is authorized to access the distributed database; and provide, to the second user device and based on determining that the second user device is authorized to access the distributed database, the evidence information to indicate that the first user device is associated with the data operation.

8. The device of claim 7, wherein the one or more processors, when detecting the data operation, are configured to:
receive, from the first user device, a communication associated with the data operation,
wherein the communication identifies one or more parameters of the data operation, and
wherein the evidence information indicates the one or more parameters of the data operation.

9. The device of claim 7, wherein the identification information includes a user identifier associated with the user and a device identifier associated with the first user device.

10. The device of claim 7, wherein the one or more processors, when determining the identification information, are configured to:
perform an authentication process that includes obtaining user credentials of the application,
wherein the identification information corresponds to a user identifier of the user credentials.

11. The device of claim 7, wherein the one or more processors are further configured to:
prior to generating the evidence information, analyze a communication associated with the data operation; and
determine, based on the communication, one or more parameters associated with the data operation,
wherein the evidence information includes data operation information associated with the one or more parameters.

12. The device of claim 7, wherein the one or more processors are further configured to:
activate a suspension of the data operation until the evidence information is stored in the immutable data structure,
wherein the one or more processors, when enabling the performance of the data operation, are configured to:
deactivate, after the evidence information is stored in the immutable data structure, the suspension of the data operation to permit the performance of the data operation.

13. A non-transitory computer-readable medium storing a set of instructions, the set of instructions comprising:
one or more instructions that, when executed by one or more processors of a device, cause the device to:
intercept a communication from a first user device to a distributed database,
wherein the communication is associated with a data operation that involves a plurality of data structures of the distributed database;
suspend the data operation from being performed within the distributed database until evidence information associated with the data operation is persisted in an immutable data structure;
determine, based on the communication, the evidence information,
wherein the evidence information identifies one or more parameters of the data operation including one or more identifiers of the plurality of data structures that is associated with data the data operation,
wherein the one or more identifiers of the plurality of data structures include addresses of the plurality of data structures in the distributed database, and
wherein the association of the plurality of data structures with the data operation includes at least one of reading data from at least one data structure of the plurality of data structures or updating the data on the at least one data structure;
store the evidence information in the immutable data structure to record that the first user device is associated with the data operation;
deactivate a suspension of the data operation based on determining that the evidence information has been stored in the immutable data structure;
receive, from a second user device, a query associated with the evidence information,
wherein the first user device is associated with a first organization and the second user device is associated with a second organization that is separate from the first organization;
determine that the second user device is authorized to access the distributed database; and
provide, to the second user device and based on determining that the second user device is authorized to access the distributed database, the evidence information to indicate that the first user device is associated with the data operation.

14. The non-transitory computer-readable medium of claim 13, wherein the device comprises a centralized server that is configured to manage data operations of the distributed database associated with the plurality of data structures of the distributed database.

15. The non-transitory computer-readable medium of claim 13, wherein the one or more instructions further cause the device to:
prior to determining the evidence information, perform an authentication process based on identification information in the communication to determine whether the first user device is authorized to perform the data operation,
wherein the evidence information is determined based on the authentication process indicating that the user is authorized to perform the operation.

16. The non-transitory computer-readable medium of claim 13, wherein the one or more parameters include at least one of:
an identifier of the first user device;
an identifier of a user of an application associated with the data operation;
timing associated with the data operation;
a type of the data operation; or
update data associated with the data operation.

17. The non-transitory computer-readable medium of claim 13, wherein the one or more instructions further cause the device to:
enable, after the evidence information is stored in the immutable data structure, the data in the plurality of data structures to be read and/or updated according to the data operation.

* * * * *